United States Patent
Miro

(10) Patent No.: US 7,189,035 B2
(45) Date of Patent: Mar. 13, 2007

(54) CABINET DOOR KNOB PULL MEASURING JIG

(76) Inventor: Anthony W. Miro, 190 Old Tamiami Trail, Naples, FL (US) 34110

( * ) Notice: Subject to any disclaimer, the term of this patent is extended or adjusted under 35 U.S.C. 154(b) by 0 days.

(21) Appl. No.: 11/200,968

(22) Filed: Aug. 10, 2005

(65) Prior Publication Data

US 2007/0036619 A1    Feb. 15, 2007

(51) Int. Cl.
    *B23B 47/28*    (2006.01)
(52) U.S. Cl. .................... 408/115 R; 408/97
(58) Field of Classification Search .......... 408/97, 408/115 R, 103, 241 B
    See application file for complete search history.

(56) References Cited

U.S. PATENT DOCUMENTS

| | | | | |
|---|---|---|---|---|
| 310,710 | A | * | 1/1885 | Nichols ............ 408/97 |
| 990,502 | A | * | 4/1911 | Richardson ........... 33/197 |
| 1,210,942 | A | * | 1/1917 | Jones ............ 408/104 |
| 1,476,611 | A | * | 12/1923 | Hines ............ 408/88 |
| 2,029,650 | A | * | 2/1936 | Betz ............ 408/115 R |
| 2,435,256 | A | * | 2/1948 | Brody et al. ......... 408/115 R |
| 2,582,606 | A | | 1/1952 | Riddle |
| 2,807,095 | A | | 9/1957 | Maxwell |
| 2,821,027 | A | | 1/1958 | Billhimer, Sr. |
| 2,838,966 | A | * | 6/1958 | Campbell ........... 408/115 R |
| 2,842,860 | A | | 7/1958 | Gray |
| 2,949,798 | A | | 8/1960 | Berta, Jr. |
| 2,990,733 | A | * | 7/1961 | Garcia ............ 408/72 R |
| 3,583,823 | A | * | 6/1971 | Eaton et al. ........ 408/115 R |
| 4,257,166 | A | * | 3/1981 | Barker et al. ........ 405/241 G |
| 4,684,299 | A | | 8/1987 | Laliberte |
| 4,791,732 | A | | 12/1988 | Bruno, Jr. et al. |
| 4,873,769 | A | | 10/1989 | Casanave |
| 4,952,101 | A | | 8/1990 | Coombs |
| 5,064,319 | A | | 11/1991 | Ericksen |
| 5,308,199 | A | * | 5/1994 | Juang .............. 408/115 R |
| 5,407,306 | A | * | 4/1995 | Klapperich ........ 408/115 R |
| 5,590,986 | A | * | 1/1997 | Juang .............. 408/115 R |

(Continued)

FOREIGN PATENT DOCUMENTS

DE            4128472 A1 *    10/1993

(Continued)

*Primary Examiner*—Monica Carter
*Assistant Examiner*—Michael W. Talbot
(74) *Attorney, Agent, or Firm*—The Livingston Firm; Edward M. Livingston; Angela M. Miller

(57) ABSTRACT

A cabinet door knob pull measuring jig (1) comprising a frame having a baseboard (2) and a backboard (3) which are connected together to form an L-shape, a drilling plate (4) adjustably attached within a vertical slot (12) located in the backboard (3) and at least one sliding block (5) adjustably attached to a vertical slot (7) located in the drilling plate (4). At least one pilot hole (6) is located in the at least one sliding block (5). A second embodiment of the measuring jig (1) utilizes the same baseboard (2) and backboard (3). However, rather than using at least one sliding block (5), the drilling plate (4) itself has at least one pilot hole (6) located thereon. The use of the present invention will permit a person to quickly identify the location of a hole to be drilled on a cabinet door for a knob pull in an accurate and precise manner.

22 Claims, 4 Drawing Sheets

U.S. PATENT DOCUMENTS

| | | | | |
|---|---|---|---|---|
| 5,743,684 A | * | 4/1998 | Rex | 408/115 R |
| 5,775,856 A | * | 7/1998 | Woodard | 408/103 |
| 5,807,036 A | | 9/1998 | Lostlen | |
| 5,813,803 A | * | 9/1998 | Sommerfeld | 408/115 R |
| 5,940,979 A | * | 8/1999 | Ericksen et al. | 33/667 |
| 6,804,891 B1 | | 10/2004 | Hurtgam | |

FOREIGN PATENT DOCUMENTS

| EP | 12711 A1 | * | 6/1980 |
|---|---|---|---|

* cited by examiner

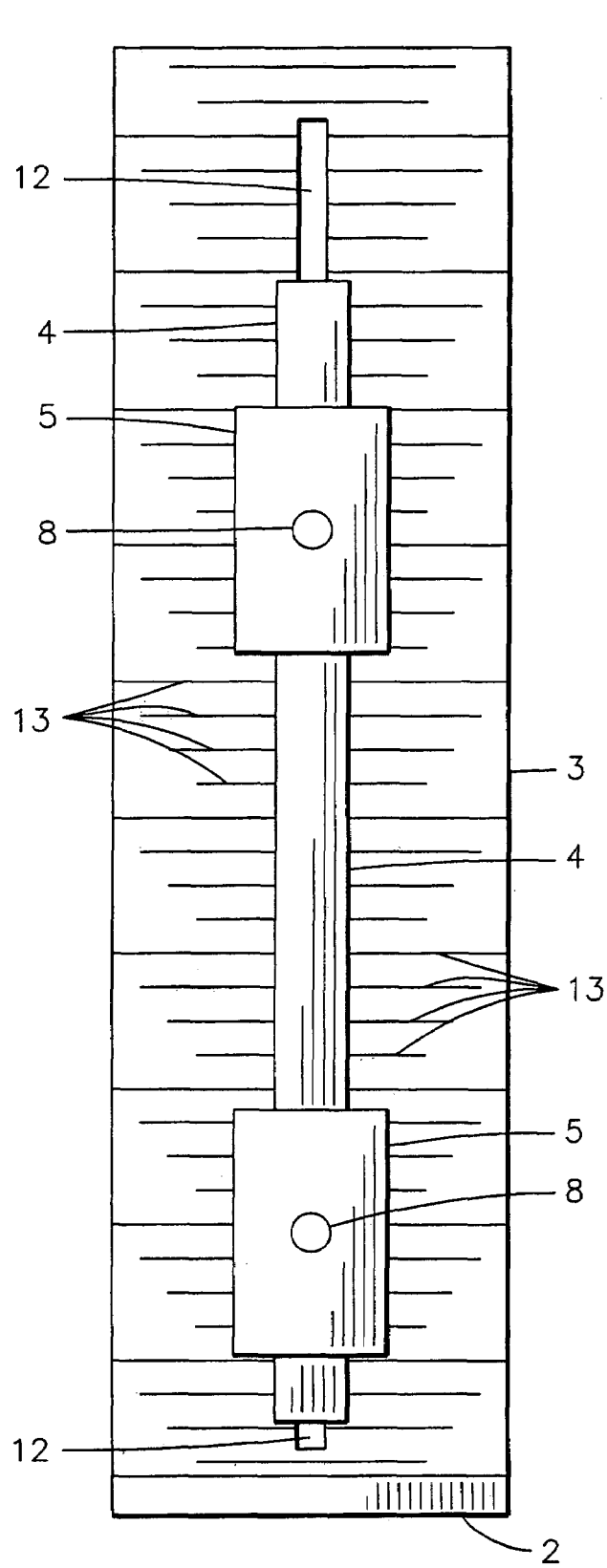
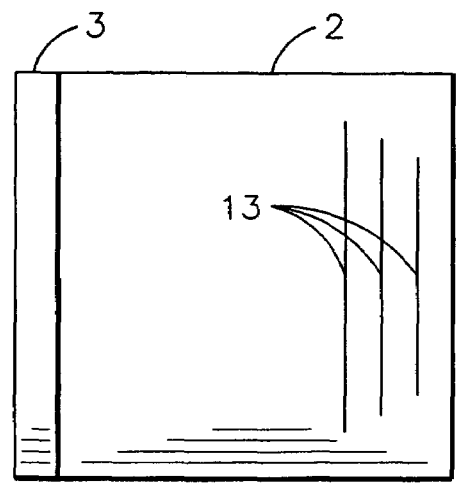
FIG. 4
FIG. 3

CABINET DOOR KNOB PULL MEASURING JIG

BACKGROUND OF THE INVENTION

This invention relates to measuring jigs, more particularly, a cabinet door knob pull measuring jig that permits a person to quickly identify the location of a hole to be drilled on a cabinet door for a knob pull in an accurate and precise manner.

Many cabinet manufacturers do not include holes in the cabinet doors for a variety of reasons. For instance, customers prefer to personalize the cabinet door by selecting his or her own knob pulls, which vary in hole locations. In addition, in order to further customize the cabinet door, customers select the location of the knob pulls, which are also known as jewelry, on the cabinet door. Although drilling holes into a cabinet door for the knob pulls may seem like a simple task, it is more difficult than one realizes.

Accurate measuring is an essential step when drilling holes for knob pulls. Currently, many cabinet installers or do-it-yourselfers use a standard tape measure to measure the horizontal and vertical distances from the edges of the cabinet door to pinpoint the exact location of the hole to be drilled. Once the first cabinet door hole is drilled, the person then must measure each and every cabinet door thereafter to achieve the same result. Not only is this method time-consuming, but if a measurement is slightly off, the resulting cabinet door is a painful eyesore as the knobs do not line-up appropriately and may require the cabinet door to be replaced.

Although there currently exist a wide range of measuring jigs which attempt to quickly and accurately measure the location for a knob pull hole, the jigs are either too cumbersome for quick use, not versatile enough to use on a wide variety of cabinet sizes, not durable enough for heavy use or simply too large in size for easy portability.

Thus, a need exists for a cabinet door knob pull measuring jig that permits a person to quickly identify the location of a hole to be drilled on a cabinet door for a knob pull in an accurate and precise manner, yet is versatile, lightweight, compact and durable.

The relevant prior art includes the following references:

| Patent No. (U.S. unless stated otherwise) | Inventor | Issue/Publication Date |
| --- | --- | --- |
| 4,873,769 | Casanave | Oct. 17, 1989 |
| 4,791,732 | Bruno, Jr. et al. | Dec. 20, 1988 |
| 5,064,19 | Ericksen | Nov. 12, 1991 |
| 4,952,101 | Coombs | Aug. 28, 1990 |
| 4,684,299 | Laliberte | Aug. 4, 1987 |
| 2,821,027 | Billhimer, Sr. | Jan. 28, 1958 |
| 6,804,891 | Hurtgam | Oct. 19, 2004 |
| 5,807,036 | Lostlen | Sep. 15, 1998 |
| 3,583,823 | Eaton et al. | Jun. 8, 1971 |
| 2,582,606 | Riddle | Jan. 15, 1952 |
| 2,842,860 | Gray | Jul. 15, 1958 |
| 2,807,095 | Maxwell | Sep. 24, 1957 |
| 2,949,798 | Berta, Jr. | Aug. 23, 1960 |

SUMMARY OF THE INVENTION

The primary object of the present invention is to provide a cabinet door knob pull measuring jig that allows a person to quickly identify the location of a hole to be drilled on a cabinet door for a knob pull in an accurate and precise manner.

A further object of the present invention is to provide a cabinet door knob pull measuring jig that is versatile.

An even further object of the present invention is to provide a cabinet door knob pull measuring jig that is lightweight.

Another object of the present invention is to provide a cabinet door knob pull measuring jig that is compact.

A further object of the present invention is to provide a cabinet door knob pull measuring jig that is durable.

The present invention fulfills the above and other objects by providing a cabinet door knob pull measuring jig comprising a frame having a baseboard and a backboard, a drilling plate adjustably attached to a vertical slot located in the backboard and at least one sliding block is located in a vertical slot on the drilling plate for the acceptance of a drill bit. To use, a person first places a cabinet door flush along the baseboard and backboard. Then, he or she adjusts the drilling plate in the vertical slot on the backboard and the sliding block in the vertical slot on the drilling plate so as to pinpoint the exact location in which a hole for a knob pull is to be drilled. Next, he or she secures the drilling plate and sliding block so they do not move. Finally, a person inserts a drill bit into a pilot hole and drills a hole into the cabinet door. Markings on the baseboard and backboard permit the user to determine the measurements from the edge of the cabinet door that were used. The user simply positions another cabinet door in the measuring jig to continue drilling accurate and precise holes into cabinet doors. In addition, a person may flip the jig and use the reverse side of the measuring jig to measure and drill holes into the opposite side, for instance, left hand side, of the cabinet door.

An alternate embodiment of the present invention fulfills the above and other objects by providing a cabinet door knob pull measuring jig comprising a frame having a baseboard and a backboard and a drilling plate adjustably attached to a vertical slot located in the backboard. However, rather than using at least one sliding block, the alternate embodiment of the present invention has at least one pilot hole located on the drilling plate. The use of the present invention will permit a person to quickly identify the location of a hole to be drilled on a cabinet door for a knob pull in an accurate and precise manner. A person uses the alternate embodiment of the present invention in the manner described above.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which:

FIG. 3 is a front view of a first embodiment of the present invention;

FIG. 4 is a top view of a baseboard of a first embodiment of the present invention;

DESCRIPTION OF THE PREFERRED EMBODIMENTS

Figures 1, 2:
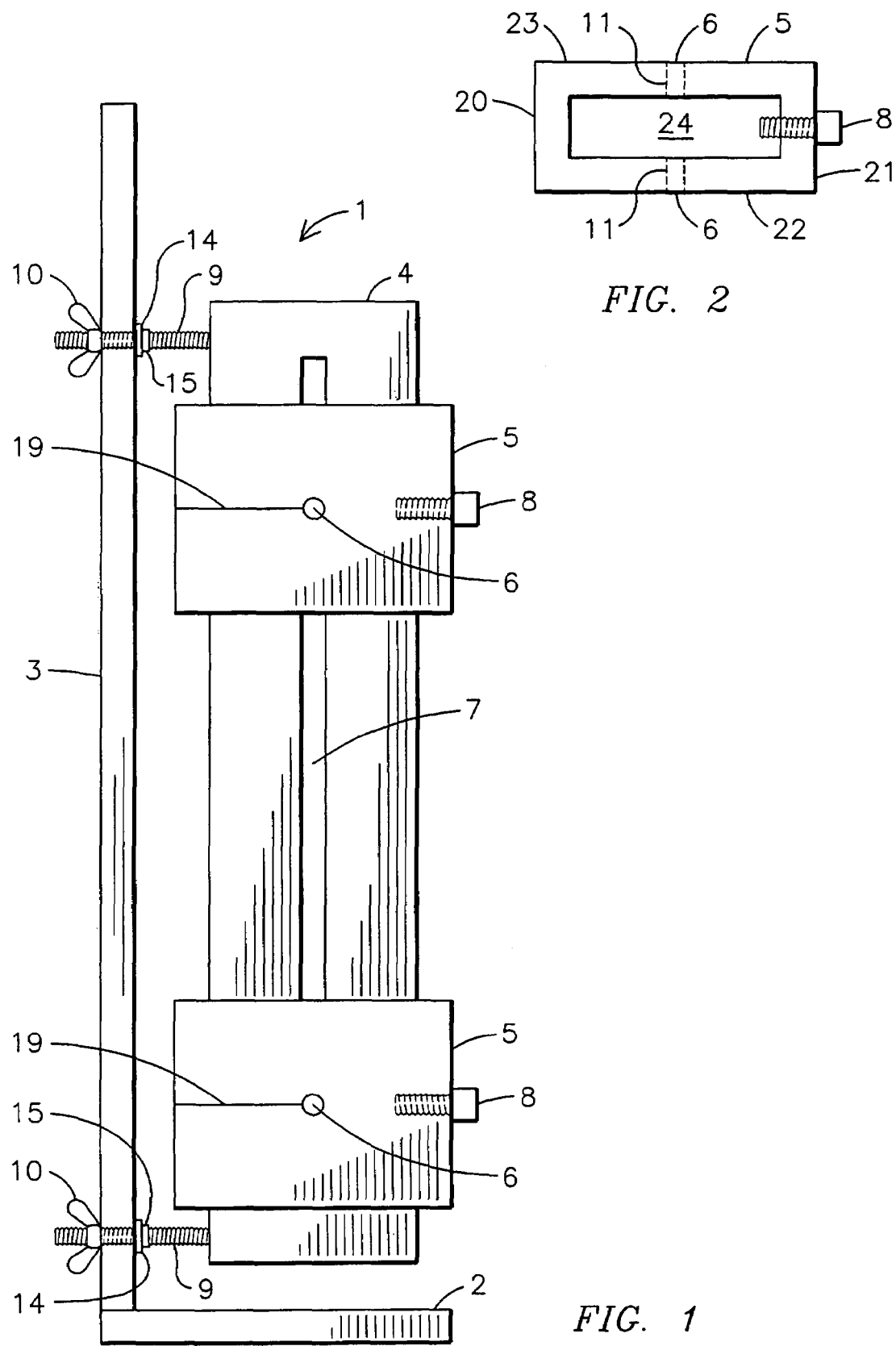
FIG. 1 is a side plan view of a first embodiment of a cabinet door knob pull measuring jig of the present invention.
FIG. 2 is a top view of a sliding block of a first embodiment of the present invention.

For purposes of describing the preferred embodiment, the terminology used in reference to the numbered components in the drawings is as follows:

| | |
|---|---|
| 1. door knob pull measuring jig, generally | 14. washer |
| 2. baseboard | 15. nut |
| 3. backboard | 16. cabinet door |
| 4. drilling plate | 17. drill |
| 5. sliding block | 18. drill bit |
| 6. pilot hole | 19. line-up marking |
| 7. drilling plate slot | 20. proximal side of sliding block |
| 8. thumb screw | 21. distal side of sliding block |
| 9. screw | 22. front side of sliding block |
| 10. wingnut | 23. rear side of sliding block |
| 11. pilot hole guide | 24. opening |
| 12. backboard slot | 25. steel bushings |
| 13. marking | |

With reference to FIG. 1, a side plan view of a first embodiment of the present invention is shown. The door knob pull measuring jig 1 includes a baseboard 2 and a backboard 3 attached to one another perpendicularly. A drilling plate 4 having a drilling plate slot 7 is adjustably secured to the backboard 3 via screws 9 extending from the drilling plate 4 and wingnuts 10. Washers 14 and nuts 15 are located on the screws 9 so as to assist in the positioning and holding of the drilling plate 4. At least one sliding block 5 is adjustably secured to the drilling plate 4. The sliding bock 5 includes at least one pilot hole 6 positioned in vertical alignment with the drilling plate slot 7. At least one thumbscrew 8 is located on the sliding block 5 for tightening the sliding block 5 on the drilling plate 4. Line-up markings 19 are located adjacent to the pilot holes 6.

With reference to FIG. 2, a top view of a sliding block 5 of a first embodiment of the present invention is shown. The sliding block 5 has a proximal side 20, a distal side 21, a front side 22 and a rear side 23. The sides 20, 21, 22 and 23 are formed so as to create an opening 24. The opening 24 is sized so as to accommodate the drilling plate 4 of the present invention. When the sliding block 5 is placed on the drilling plate 4, the pilot hole 6 lines up with the drilling plate slot 7 so as to allow for the acceptance of a drill bit.

In FIG. 3, a front view of a first embodiment of the present invention is shown. Markings 13 are located on the backboard 3 so as to indicate the distance from the bottom of the cabinet to the location of the hole to be drilled. A backboard slot 12 is located in the backboard 3 and allows for the adjustment of the drilling plate 4 in a vertical manner.

FIG. 4 shows a top view of a baseboard of a first embodiment of the present invention. Markings 13 are located on the baseboard 2 so as to indicate the distance from the side edge of the cabinet to the location of the hole to be drilled when the drilling plate 4 is moved horizontally via the use of fastening means, such as a screw 9 and wingnut 10.

Figure 5:
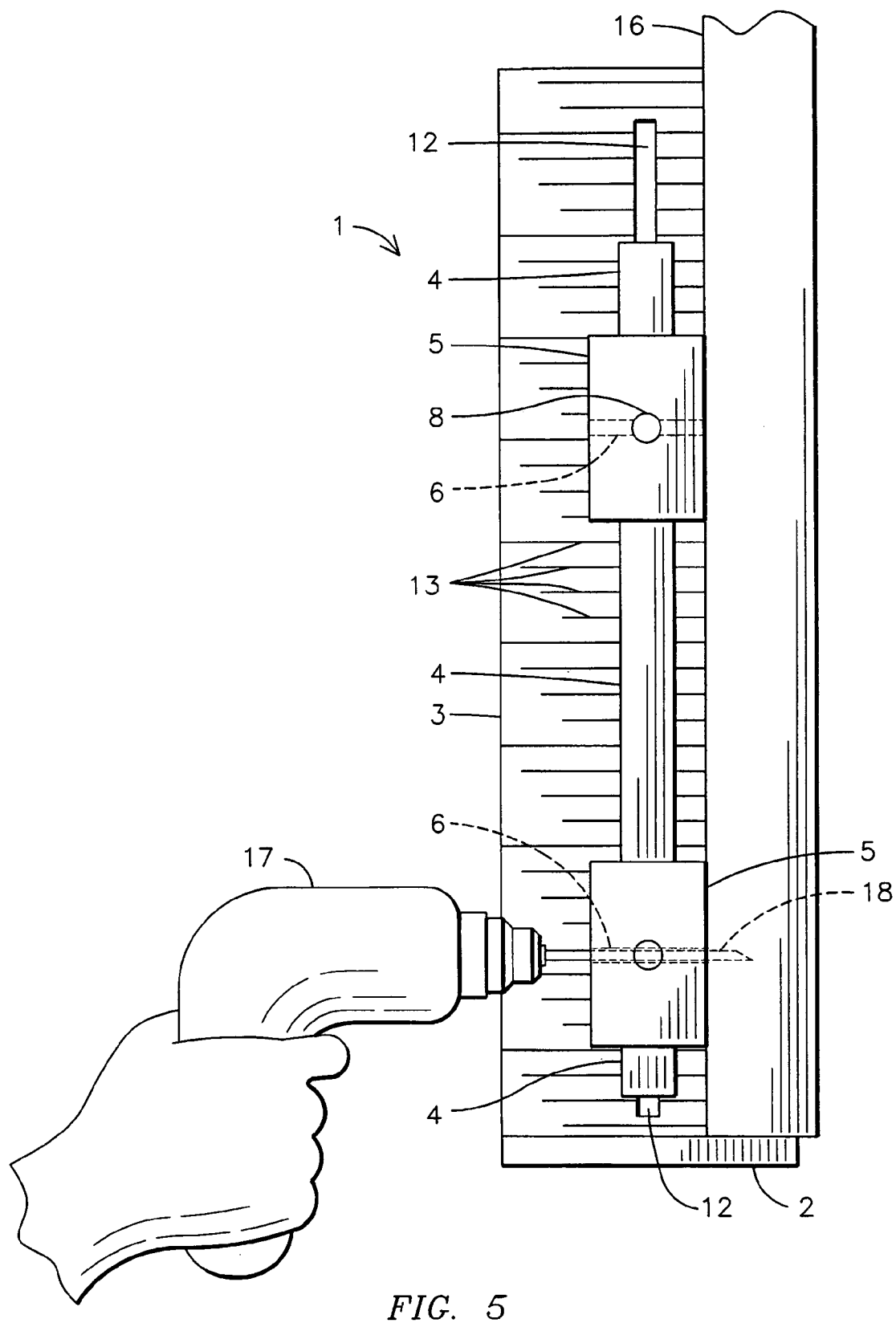
FIG. 5 is a front view of a first embodiment of the present invention in use.

Next, FIG. 5 shows a front view of a first embodiment of the present invention in use. To use the present invention, a user places a cabinet door 16 on the door knob pull measuring jig 1 so the cabinet door 16 is against the baseboard 2 and the backboard 3 of the jig 1, as well as against the sliding block(s) 5. The user then adjusts the drilling plate 4 and the sliding blocks 5 so the line-up markings 19 are in line with the desired markings 13 for the drilling of a hole for a knob pull. The user then tightens the drilling plate 4 and the sliding block(s) 5. Finally, the user inserts the drill bit 18 of the drill 17 into the desired pilot hole 6 and drills a hole. Because markings 13 may be seen from either side of the drilling plate 4, a person may position another cabinet on other side of the drilling plate 4 so as to mark and drill a hole on the opposite side of the cabinet, i.e., left hand as opposed to left hand side of the cabinet door 16.

Figure 6:
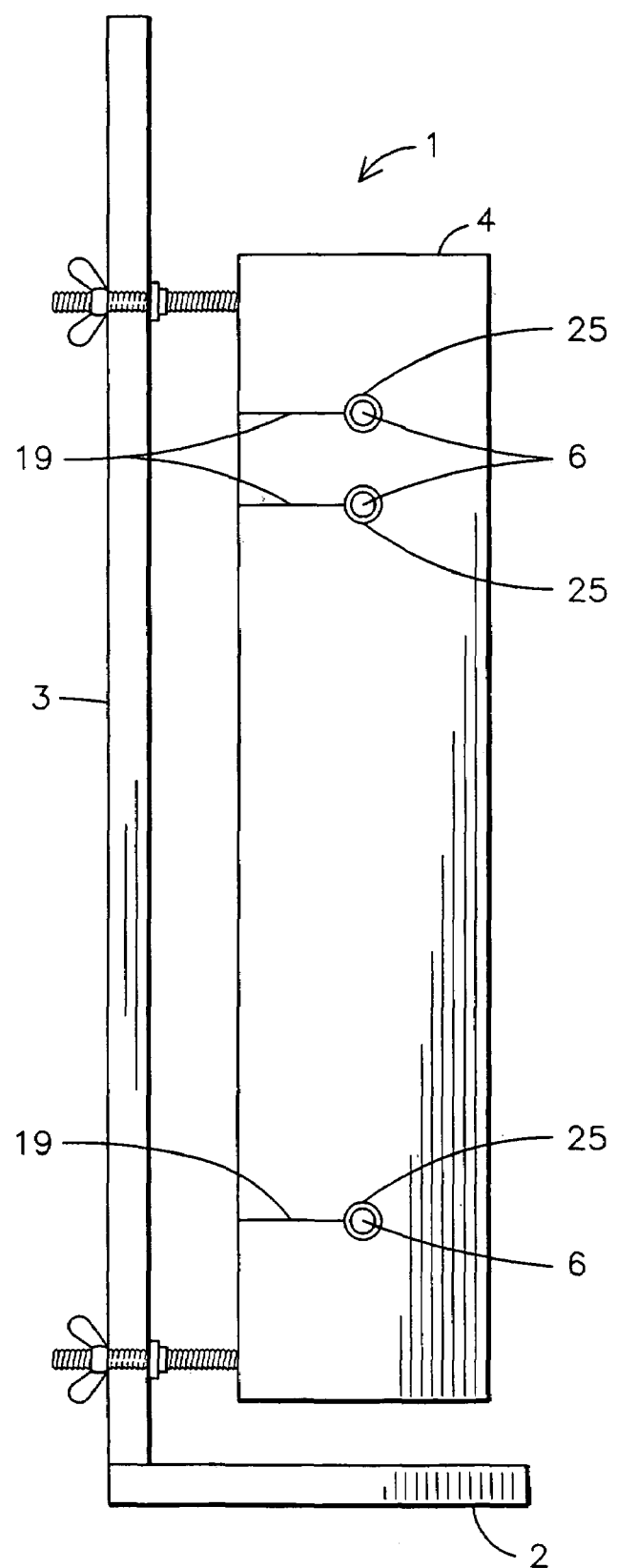
FIG. 6 is a side view of a second embodiment of the present invention.

Finally, FIG. 6 is a side view of a second embodiment of the present invention. Similar to the first embodiment, the second embodiment of the door knob pull measuring jig 1 of the present invention includes a frame having a baseboard 2 and a backboard 3 wherein the backboard 3 has a backboard slot 12. However, the adjustable drilling plate 4 of the second embodiment does not include a drilling plate slot as in the first embodiment and does not include sliding blocks 5. Rather, the drilling plate 4 of the second embodiment has pilot holes 6 and line-up markings 19 located directly on the drilling plate 4. The second embodiment, as well as the first embodiment, may also include steel bushings 25 in the pilot holes 6 so as to allow for a longer-lasting and more durable door knob pull measuring jig 1. Because the backboard slot 12 is located on the backboard 3 and the backboard 3 and baseboard 2 form a true L-shape, the drilling plate 4 may extend beyond the backboard 3 when in use.

The use of the present invention will allow a person to quickly identify the location of a hole to be drilled on a cabinet door for a knob pull in an accurate and precise manner.

It is to be understood that while a preferred embodiment of the invention is illustrated, it is not to be limited to the specific form or arrangement of parts herein described and shown. It will be apparent to those skilled in the art that various changes may be made without departing from the scope of the invention and the invention is not be considered limited to what is shown and described in the specification and drawings.

Having thus described my invention, I claim:

1. A cabinet door knob pull measuring jig comprising:
a frame having a baseboard and a backboard;
said backboard being connected perpendicularly to said baseboard to form an L-shape;
said backboard having a vertical slot;
a drilling plate adjustably secured perpendicularly within said backboard vertical slot for vertical adjustment of the drilling plate in relation to the backboard;
a means for adjusting the drilling plate in horizontal relation to the backboard;
said drilling plate having a vertical slot;
at least one sliding block adjustably secured to said drilling plate vertical slot;
said at least one sliding block having a proximal side, a distal side, a front side and a rear side; and
at least one pilot hole located in said at least one sliding block.

2. The cabinet door knob pull measuring jig of claim 1 wherein:
said backboard has at least one marking.

3. The cabinet door knob pull measuring jig of claim 2 wherein:
said baseboard has at least one marking.

4. The cabinet door knob pull measuring jig of claim 1 wherein:
said baseboard has at least one marking.

5. The cabinet door knob pull measuring jig of claim 1 further comprising:
at least one screw extending from said drilling plate and insertable into said backboard vertical slot.

6. The cabinet door knob pull measuring jig of claim 5 wherein:
said drilling plate is adjustably secured to said backboard slot by a wingnut on said at least one screw.

7. The cabinet door knob pull measuring jig of claim 1 wherein:
at least one line-up marking is located adjacent to said at least one pilot hole.

8. The cabinet door knob pull measuring jig of claim 1 wherein:
a steel bushing is inserted into said at least one pilot hole.

9. The cabinet door knob pull measuring jig of claim 1 further comprising:
an opening located in said sliding block for receiving said drilling plate.

10. The cabinet door knob pull measuring jig of claim 9 wherein:
at least one screw is located on said proximal side of said sliding block.

11. The cabinet door knob pull measuring jig of claim 1 wherein:
said means for adjusting the drilling plate in horizontal relation to the backboard is via at least one screw and at least one wingnut.

12. A cabinet door knob pull measuring jig comprising:
a frame having a baseboard and a backboard;
said backboard being connected perpendicularly to said baseboard to form an L-shape;
said backboard having a vertical slot;
a drilling plate adjustably secured perpendicularly within said backboard vertical slot for vertical adjustment of the drilling plate in relation to the backboard;
a means for adjusting the drilling plate in horizontal relation to the backboard; and
at least one pilot hole located in said drilling plate wherein said at least one pilot hole extends through said drilling plate in a direction perpendicular to said backboard.

13. The cabinet door knob pull measuring jig of claim 12 wherein:
said backboard has at least one marking.

14. The cabinet door knob pull measuring jig of claim 13 wherein:
said baseboard has at least one marking.

15. The cabinet door knob pull measuring jig of claim 12 wherein:
said baseboard has at least one marking.

16. The cabinet door knob pull measuring jig of claim 12 further comprising:
at least one screw extending from said drilling plate and insertable into said backboard vertical slot.

17. The cabinet door knob pull measuring jig of claim 16 wherein:
said drilling plate is adjustably secured to said backboard slot by a wingnut on said at least one screw.

18. The cabinet door knob pull measuring jig of claim 12 wherein:
at least one line-up marking is located adjacent to said at least one pilot hole.

19. The cabinet door knob pull measuring jig of claim 12 wherein:
a steel bushing is inserted into said at least one pilot hole.

20. The cabinet door knob pull measuring jig of claim 12 wherein:
said means for adjusting the drilling plate in horizontal relation to the backboard is via at least one screw and at least one wingnut.

21. A cabinet door knob pull measuring jig comprising:
a frame having a baseboard and a backboard;
said backboard being connected perpendicularly to said baseboard to form an L-shape;
said backboard having a vertical slot;
a drilling plate adjustably secured perpendicularly within said backboard vertical slot for vertical adjustment of the drilling plate in relation to the backboard;
a means for adjusting the drilling plate in horizontal relation to the backboard;
said drilling plate having a vertical slot;
at least one sliding block adjustably secured to said drilling plate vertical slot;
said backboard has at least one marking;
said baseboard has at least one marking;
at least one screw extending from said drilling plate and insertable into said backboard vertical slot;
said drilling plate is adjustably secured to said backboard slot by a wingnut on said at least one screw;
an opening located in said sliding block for receiving said drilling plate;
said at least one sliding block having a proximal side, a distal side, a front side and a rear side;
at least one screw located on said proximal side of said sliding block;
at least one pilot hole located in said at least one sliding block;
a steel bushing inserted into said at least one pilot hole; and
at least one line-up marking located adjacent to said at least one pilot hole.

22. The cabinet door knob pull measuring jig of claim 21 wherein:
said means for moving the drilling plate in horizontal relation to the backboard is via at least one screw and at least one wingnut.

* * * * *